United States Patent
Pan et al.

(10) Patent No.: US 11,992,803 B2
(45) Date of Patent: *May 28, 2024

(54) METHOD OF DETERMINING REMAINING USEFUL LIFETIME OF MEMBRANE FOR SEPARATION PROCESS

(71) Applicant: Schlumberger Technology Corporation, Sugar Land, TX (US)

(72) Inventors: Shu Pan, Sugar Land, TX (US); George E. Mahley, III, Berkeley, CA (US); Atsushi Morisato, Walnut Creek, CA (US); Oleg O. Medvedev, Missouri City, TX (US); Jason M. Dietrich, Walnut Creek, CA (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 619 days.

This patent is subject to a terminal disclaimer.

(21) Appl. No.: 17/262,956

(22) PCT Filed: Jul. 29, 2019

(86) PCT No.: PCT/US2019/043899
§ 371 (c)(1),
(2) Date: Jan. 25, 2021

(87) PCT Pub. No.: WO2020/023956
PCT Pub. Date: Jan. 30, 2020

(65) Prior Publication Data
US 2021/0308621 A1    Oct. 7, 2021

Related U.S. Application Data

(60) Provisional application No. 62/711,134, filed on Jul. 27, 2018.

(51) Int. Cl.
*B01D 53/22* (2006.01)
*B01D 53/30* (2006.01)
(Continued)

(52) U.S. Cl.
CPC ............. *B01D 53/22* (2013.01); *B01D 53/30* (2013.01); *G06F 18/214* (2023.01); *G06N 20/00* (2019.01); *B01D 2311/24* (2013.01)

(58) Field of Classification Search
None
See application file for complete search history.

(56) References Cited

U.S. PATENT DOCUMENTS

2011/0035195 A1    2/2011  Subbiah et al.
2016/0214732 A1*   7/2016  Vigliotta ................ B01D 53/30
(Continued)

FOREIGN PATENT DOCUMENTS

| CN | 105152317 A | 12/2015 |
| WO | 2015161968 A1 | 10/2015 |
| WO | 2016122067 A1 | 8/2016 |

OTHER PUBLICATIONS

N.J. Gordon, D.J. Salmond and A.F.M. Smith, Novel approach to non-linear/non-Gaussian Bayesian state estimation, IEEE Proceedings-F, vol. 140, No. 2, Apr. 1993 (7 pages).
(Continued)

*Primary Examiner* — Jason M Greene
(74) *Attorney, Agent, or Firm* — Matthew Goode

(57) ABSTRACT

Membranes used in membrane separation technologies change over time due to changes in physical characteristics of the membrane. Predicting remaining useful lifetime of a membrane is performed by fitting an evolution model of the membrane to real-time performance characteristics recorded for the membrane and by comparing later performance characteristics of the membrane to the evolution model.

(Continued)

Updating an evolution model during membrane operation improves estimates of remaining useful membrane lifetime and allows for accurate estimates of estimated membrane end-of-life.

18 Claims, 3 Drawing Sheets

(51) Int. Cl.
  *G06F 18/214*    (2023.01)
  *G06N 20/00*    (2019.01)

(56) References Cited

U.S. PATENT DOCUMENTS

2017/0014774 A1* 1/2017 Daniello ............... B01D 53/30
2020/0164307 A1* 5/2020 Claris ................... B01D 53/30
2021/0138394 A1   5/2021 Pan et al.

OTHER PUBLICATIONS

International Search Report and Written Opinion issued in the PCT Application PCT/US2019/043886, dated Nov. 11, 2019 (9 pages).
David, Oana Christina et al., Mixed gas separation study for the hydrogen recovery from H2/CO/N2/CO2 post combustion mixtures using a Matrimid membrane, Journal of Membrane Science, 2011, vol. 378, pp. 359-368.
Ribeiro JR., Caludio P. et al., Pure-and mixed-gas carbon dioxide/ethane permeability and diffusivity in a cross-linked poly (ethylene oxide) copolymer, Journal of Membrane Science, 2011, vol. 377, pp. 110-123.
Chen, Junjie et al., Computational fluid dynamics modeling of the millisecond methane steam reforming in microchannel reactors for hydrogen production, RSC Advances, Jul. 16, 2018, vol. 8, pp. 25183-25200.
Xia, Jianzhong et al., Physical aging and carbon dioxide plasticization of thin polyimide films in mixed gas permeation, Journal of Membrane Science, 2014, vol. 450, pp. 457-468.
Muller, Nils et al., Physical ageing and lifetime prediction of polymer membranes for gas separation processes, Journal of Membrane Science, 2016, vol. 516, pp. 33-46.
International Search report and written opinion issued in the PCT Application PCT/US2019/043899, dated Nov. 11, 2019 (9 pages).
International Preliminary Report on Patentability issued in the PCT Application PCT/US2019/043886, dated Feb. 11, 2021 (6 pages).
International Preliminary Report on Patentability issued in the PCT Application PCT/US2019/043899, dated Feb. 11, 2021 (6 pages).

\* cited by examiner

METHOD OF DETERMINING REMAINING USEFUL LIFETIME OF MEMBRANE FOR SEPARATION PROCESS

CROSS-REFERENCE TO RELATED APPLICATIONS

This application claims benefit of U.S. Provisional Patent Application Ser. No. 62/711,134 filed Jul. 27, 2018, the entirety of which is incorporated herein by reference.

BACKGROUND

Membrane technology is an efficient tool in gas separation. Operational performance of gas separation membranes, including the selectivity and total throughput of the membrane, changes over time, due to factors such as physical aging, plasticization, and mechanical aging. Membranes are used in numerous fields such as oil extraction, gas separation, reverse osmosis, wastewater treatment, fuel cells, and medical applications.

Membranes are consumable components of purification and separation systems, undergoing replacement when performance and/or throughput crosses a predetermined threshold. Membrane replacement at regularly scheduled intervals contributes to excess operational costs because in some cases the membranes are replaced before replacement is needed. There is a need for methods of accurately determining the best time to replace membranes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
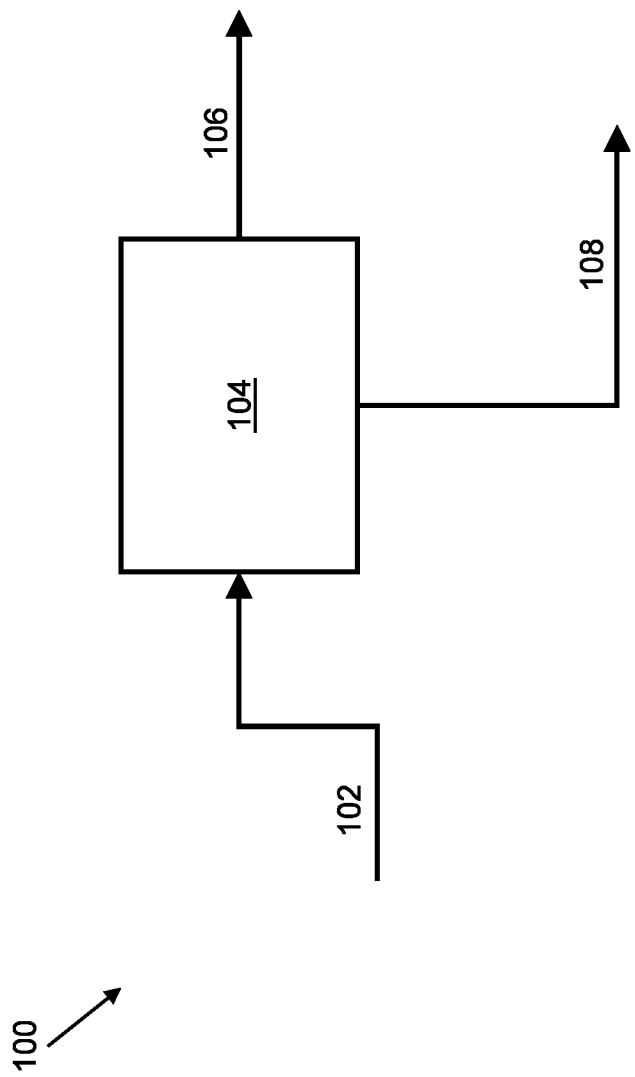
FIG. 1 is a schematic diagram of a membrane separation system, in accordance with some embodiments.

The following disclosure provides many different embodiments, or examples, for implementing different features of the provided subject matter. Specific examples of components, values, operations, and so forth, are described below to simplify the present disclosure, but these examples are not intended to be limiting. Other values, operations, arrangements, and so forth, are contemplated. The present disclosure may repeat reference numerals and/or letters in the various examples. This repetition is for the purpose of simplicity and clarity and does not in itself dictate a relationship between the various embodiments and/or configurations discussed.

Membrane technology has proven to be an efficient process for separating gaseous materials. Membranes are used in separation of liquid materials and gaseous materials that are otherwise difficult or impossible separate. Membrane technologies are used in the oil industry, medical industry applications, water filtration, and so forth. During operation, membranes age and undergo changes in performance. Changes in membrane performance are related to factors such as physical aging, mechanical aging, and plasticization of the membranes. In some cases, the changes degrade the performance of the membrane. During operation of a membrane-based separator, in the absence of a catastrophically damaging event, the decision to replace a membrane is typically made based on a comparison between key performance indicators (KPIs) and corresponding predefined membrane replacement criteria. When membrane performance either exceeds or falls below predefined performance specifications, a membrane is replaced. However, membrane change rates are not uniform among membranes that perform a same type of separation. Individual variation between membranes results in performance lifetimes ranging from several months to many years before replacement is indicated based on predefined membrane replacement criteria.

In the present disclosure, a method is proposed to estimate remaining useful lifetime (RUL) of a gas separation membrane unit to achieve membrane replacement in a prognostic or predictive manner, rather than a responsive manner based on performance criteria exceeding a predetermined replacement criterion. The method disclosed herein is applicable to estimates of useful lifetimes of many different types of membranes, not nearly membranes used in gas separation. A characteristic of a membrane separation system amenable to using the method disclosed herein is that real-time performance data of the membrane operation can be recorded during membrane operation for both the feed stream, the permeate stream, and the non-permeate stream associated with a membrane separation system. The remaining useful lifetime determination is performed using a physical model, trained by data acquired through in-situ nondestructive monitoring of membrane operations.

FIG. 1 is a schematic diagram of a membrane separation system 100. A flow of incoming material, or a feed stream, is admitted through an inlet line 102 into membrane unit 104. In some instances, a flow of incoming material is a gaseous flow. In some instances, a flow of incoming material is a liquid flow. In some instances, a flow of material is a flow of supercritical material. Membrane unit 104 includes at least one membrane for performing a separation process on the components of the incoming material flow, and incudes at least one membrane, a membrane fastening means, and a plurality of sensors configured to detect a condition of the membrane, of the flow of incoming material, or of a flow of material after exposure to the membrane (permeate and non-permeate flows). The flow of incoming material entering the membrane unit 104, is split into a permeate flow that travels through outlet line 106, and a non-permeate flow that travels through outlet line 108. The permeate flow that travels through outlet line 106 is a flow of material that has passed through, or permeated, the membrane in membrane unit 104. The non-permeate flow is material that, having entered the membrane unit 104, is forced out of the membrane unit 104 without having passed through the membrane. The pressure of the incoming material contributes to the formation of the permeate flow in outlet line 106 by applying a physical force on the membrane, keeping a supply of mixed inlet material in contact with the membrane, and promoting e.g., a chemical binding process, physical adhesion process, capillary process, or other physiochemical process associated with separating materials into separated flows using a membrane.

In some embodiments, the feed stream or the flow of incoming material is a mixture of gaseous components. In some embodiments, the feed stream is at an elevated pressure and or elevated temperature in order to promote separation of components of the gaseous mixture by a membrane in a membrane separation system. In some embodiments, the gaseous components include one or more of carbon dioxide, methane, ethane, propane, butane, isobutane, or other saturated hydrocarbons—for example a wellhead natural gas stream. In some embodiments, the gaseous components include unsaturated hydrocarbons such as ethene, propene, one or more butene isomers, one or more pentene isomers, and so forth. In some embodiments, one or more of the gaseous components includes mixtures of inorganic molecules such as ammonia, hydrogen cyanide, carbon monoxide, carbon dioxide, hydrogen sulfide, and so forth. In some embodiments, the feed stream or flow of incoming material includes liquid components, solutions, azeotropic mixtures, or other fluids amenable to separation using membrane-based separation systems to extract one fraction of the feed stream into a permeate stream and leaving a remainder, or non-permeate stream having a depleted concentration of a component separated into the permeate stream. In some embodiments, fluid feed streams used in membrane separation systems include biological fluids such as blood and/or urine.

Individual membrane modeling involves the measurement of variables flowrate Q, temperature T, pressure P and compositions $C_i$ (the index number i identifies different components in the stream exiting a membrane separator) in each stream allow the nondestructive monitoring of membrane conditions. These variables can be classified into two categories. The first category is feedstock and control variables $\overline{X}$. These parameters are determined before membrane gas separation and typically include flowrate, temperature, pressure in a line (e.g., inlet pressure), partial pressure of gaseous components in a line, chemical composition of the inlet flow or feed stream, and so forth. These parameters also include other non-process-defined operational parameters, such as the membrane maintenance or replacement schedule, profile of operators or technicians, supervising the operations, as well as the history of past conditions, and the history of specific membrane units. The second category is outlet variables V. These parameters represent the results of membrane gas separation, such as pressure of outlet lines (e.g., permeate line pressure, and non-permeate line pressure), flow rates of permeate and non-permeate fractions through outlet lines, chemical composition of the permeate and non-permeate fractions in the outlet lines, and so forth.

Additionally, the membrane units are characterized by membrane characteristic parameters $\overline{M}$ including membrane areas S and pressure normalized fluxes of each component $P_i$, and so forth.

For individual membrane degradation modeling, given $\overline{X}$ and $\overline{M}$, one obtains $\overline{Y}$ through a membrane separation model F, given below in Equation 1:

$$\overline{Y}=F(\overline{X},\overline{M}) \quad \text{(Equation 1)}$$

The function F can be a physical model of the membrane system, a statistical model, a heuristic model, or any type of model that produces useful results. And reversely, one may obtain membrane characteristics $\overline{M}$ from $\overline{X}$ and $\overline{Y}$ by the relationship described in Equation 2:

$$\overline{M}=F^{-1}(\overline{X},\overline{Y}) \quad \text{(Equation 2)}$$

Equation 2 provides a mathematical foundation to monitor membrane condition through the measurement of feed, perm and non-perm streams.

Figure 2:
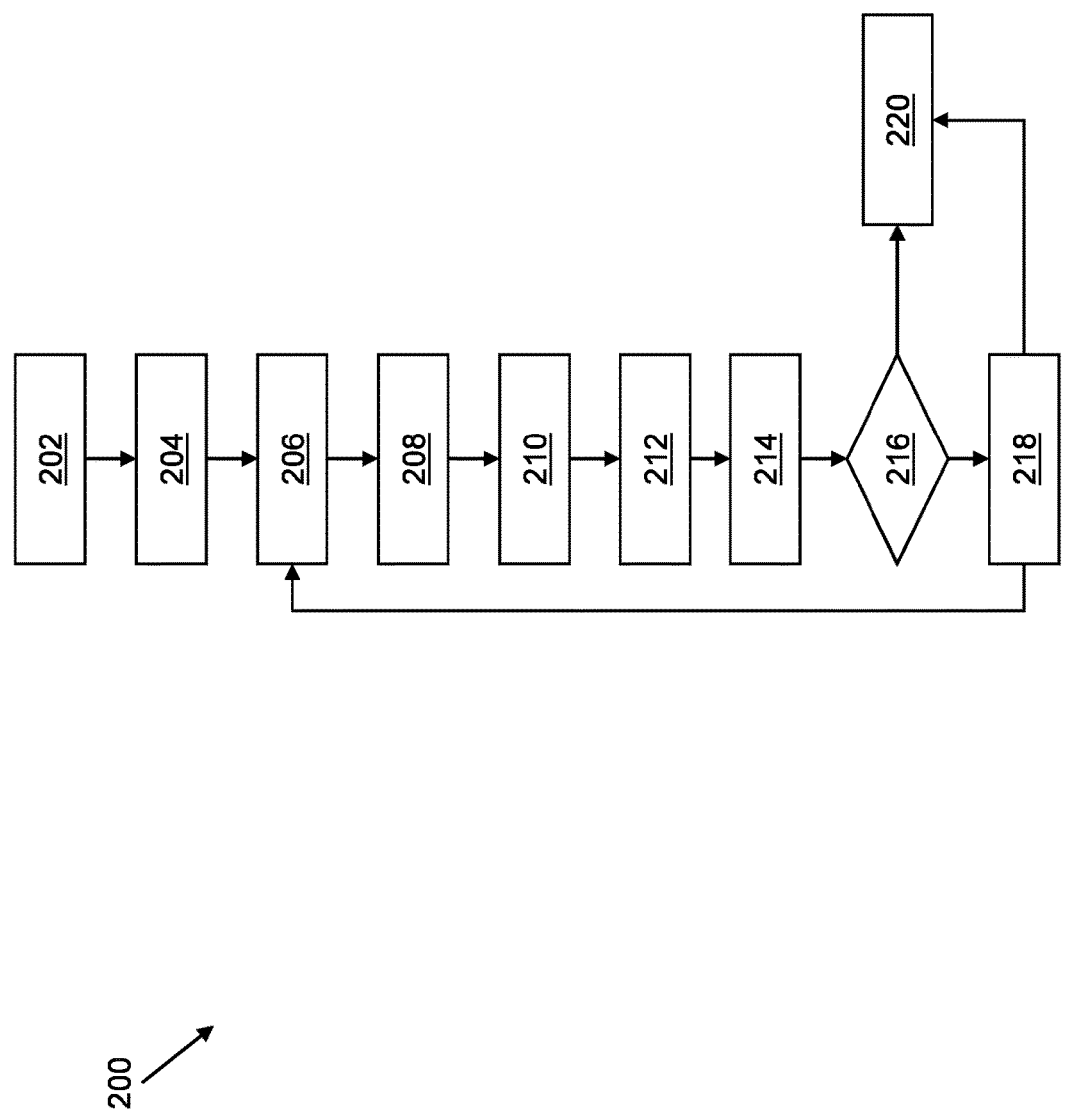
FIG. 2 is a flow diagram of a method of estimating remaining useful life of a membrane, in accordance with some embodiments.

The change in performance of a membrane unit is represented by the variation of $\overline{M}$, particularly fluxes $P_i$ of each component, with time. The modelling and forecast of these variations will lead to an estimation of RUL. The workflow to estimate the RUL of a membrane unit is summarized by the method 200 provided in FIG. 2. At operation 202, a membrane separation control system or user obtains the real time acquisition of feedstock and control variables $\overline{X}$ and outlet variables $\overline{Y}$ as described above. In some embodiments, the feedstock and control variable, and outlet variable, information may also include the history of the current unit, events related to the maintenance, replacement, change of operational conditions, and so forth.

In some embodiments, a user obtains real time membrane separation characteristic parameters $\overline{M}$ using the relationship described above in Equation 2 based on the sensor readouts of sensors connected to outlet lines 106 and 108 of the membrane separation system 100 presented in FIG. 1. In some embodiments, membrane performance characteristics identified in outlet lines 106 and 108 include gas composition, gas temperature, gas flow rate, a thermodynamic state of a chemical in the permeate or non-permeate stream, or ratios of one or more membrane performance characteristics.

The separate event detection model may be deployed to recognize/record different events and assess their impact on membrane lifetime, e.g. reduction in temperature may cause temporary reduction in performance due to condensation. This model may be rule-based or machine learning based. A membrane evolution model is trained by history matching the variation of $\overline{M}$, It may also include the history of events and operations, including maintenance and replacement. The membrane evolution model can be established by different machine learning approaches such as linear/non-linear regression, artificial neural network (ANN), etc.

Method 200 includes operation 204, in which membrane characteristic parameters are estimated using the technique summarized by Equation 2.

Method 200 includes operation 206, in which a membrane evolution model is developed based on the recorded real-time membrane characteristic parameters collected during operation 202. In some embodiments, a membrane evolution model is determined after recording membrane characteristic parameters in an initial time interval and one or more predetermined evolution models are fitted to the recorded membrane characteristic parameters for evaluation and selection. In some embodiments, a membrane evolution model is developed ab initio based on a lack of predetermined models that fit data collected during the initial time interval. In some embodiments, a model selection for a membrane is modified, subsequent to operation 218, based on a deviation of monitored membrane performance characteristic parameters from an initial model selected in operation 206.

Method 200 includes an operation 208, wherein a set of future membrane performance characteristic parameters $\overline{M}$ is generated based on the membrane evolution model developed during operation 206. With future $\overline{M}$ and $\overline{X}$, future membrane outlets Y can be estimated using Equation (1), given above.

Method 200 includes an operation 210, in which feedstock parameters and membrane control system parameters $\overline{X}$ are estimated for future intervals of membrane operation in order to compensate for anticipated membrane evolution according to the model developed during operation 206.

Method 200 includes an operation 212, in which a set of threshold values or membrane performance characteristic thresholds are determined based on the real-time membrane performance characteristics of operation 202 and the membrane evolution model of operation 206 (or, the future membrane performance characteristic parameters of operation 208).

Method 200 includes an operation 214, in which the threshold values, or membrane performance characteristic thresholds, are used to determine an anticipated membrane replacement time according to a time difference between a measurement interval of the real-time membrane characteristic collection performed an operation 202 and an estimated time at which membrane performance characteristics will correspond to the threshold values based on the membrane evolution model. With future $\bar{Y}$ and $\bar{X}$, future key performance indicators are estimated and compare with the membrane replacement criteria (e.g., the threshold values of operation 212) to determine the time when the membrane end of life (EOL) is achieved. And therefore RUL is obtained by subtracting the current time interval for measuring real time characteristics from the estimated end of life (EOL) of the membrane.

Method 200 includes an operation 216, in which, at a second time interval after the first time interval wherein real-time membrane characteristic parameters were recorded (e.g., the time interval corresponding to operation 202), additional real-time membrane characteristic parameters are recorded and compared to the threshold values determined in operation 212. When real-time membrane characteristic parameters recorded during operation 206 fall within an anticipated range of membrane characteristic parameters corresponding to normal operation of the membrane, or the membrane separation system, the method continues to operation 218. When real-time membrane characteristic parameters recorded during operation 206 exceed a threshold value, or fall outside of an anticipated range of membrane characteristic parameters corresponding to normal operation of the membrane, the membrane separation system, the method continues to operation 220.

In operation 220, the membrane separation system is turned off, feed inlet and permeate and non-permeate flows are removed, and the membrane is replaced. In operation 218, the time interval between recording of current membrane performance characteristic parameters and a previous time interval anticipated membrane replacement time is determined. When the time interval of current membrane performance characteristic parameters exceeds the previously anticipated membrane replacement time, membrane performance characteristic parameters are recorded and a user is notified that membrane replacement may be warranted. Upon receiving an input from a user, operation 220 is performed, wherein membrane replacement occurs. In the absence of an input from a user, operation 206 is performed, wherein membrane evolution models are updated based on current membrane performance characteristic parameters for continued remaining useful lifetime determinations as described above. Thus, deviations of membrane characteristic parameters are used to update a membrane evolution model, or coefficients related to the equation (2), to improve accuracy of end-of-life, or remaining useful lifetime, determinations according to the method 200.

Figure 3:
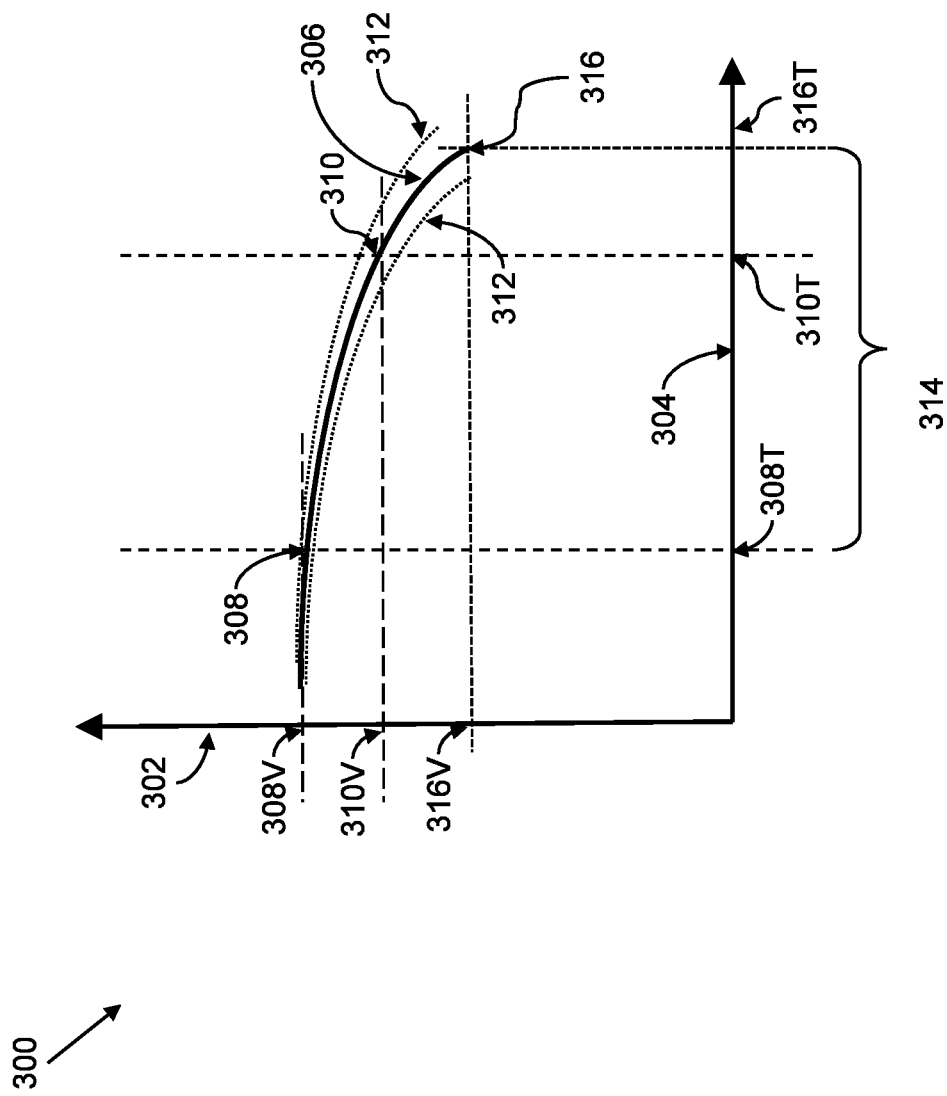
FIG. 3 is a chart of a membrane separation system performance characteristic, according to an embodiment.

FIG. 3 is a chart 300 representing a performance characteristic value on a first axis 302, measurement time on a $2^{nd}$ axis 304, and a component of a membrane evolution model 306 corresponding to values of the performance characteristic as a function of time. A first measurement of the performance characteristic is performed and a first observation 308 is recorded and compared to the degradation model 306. Observation 308 is recorded at time 318 on axis 304, and has a value 308V. Observation 310 is recorded at time 310T and has a value 310V. In FIG. 3, observation 310 falls on the model 306 and within threshold values 312 for observations corresponding to normal anticipated operation of the membrane according to the model 306. In FIG. 3, the evolution model 306 is used to estimate the remaining useful lifetime 314 corresponding to an end of life measurement at time of 316T and/or at performance value 316V of the performance characteristic monitored on axis 302.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
providing a gas mixture to a membrane separator comprising a membrane;
separating the gas mixture into a first gas and a second gas using the membrane separator;
measuring a performance characteristic of one or more of the gas mixture, the first gas, or the second gas, the membrane performance characteristic comprising at least one of a gas composition, a gas temperature, a gas flow rate, a thermodynamic state of a chemical in the permeate or non-permeate stream, or ratios thereof;
measuring a composition of the gas mixture, the first gas, and the second gas;
determining a thermodynamic state of the gas mixture;
determining a current state of the membrane based on the performance characteristics and compositions, and the thermodynamic state, using a physical model;
predicting a future state of the membrane using a membrane evolution model; and
adjusting one of the performance characteristics, or the thermodynamic state, of the gas mixture based on the predicted future state.

2. The method of claim 1, wherein the performance characteristic is a flow rate of one or more of the gas mixture, the first gas, and the second gas.

3. The method of claim 1, further comprising recording, during an initial time interval, the measured performance characteristic of one or more of the gas mixture, the first gas, and the second gas, and selecting, as the membrane evolution model, a first membrane evolution model based on the measured performance characteristic of the initial time interval.

4. The method of claim 1, further comprising measuring the performance characteristic of one or more of the gas mixture, the first gas, and the second gas, during a second time interval and determining whether a current state of the membrane exceeds a performance characteristic threshold of the membrane.

5. The method of claim 3, further comprising recording, during a second time interval, the measured performance characteristic of one or more of the gas mixture, the first gas, and the second gas, and selecting, as the membrane evolution model, a second membrane evolution model based on the measured performance characteristic of the second time interval.

6. The method of claim 5, wherein at least one of the first and the second membrane evolution models is a machine learning model.

7. The method of claim 1, further comprising comparing the predicted future state of the membrane to a standard and adjusting one of the performance characteristics, or the thermodynamic state, of the gas mixture based on the comparison.

8. The method of claim 7, wherein the membrane evolution model is trained using historical data from multiple membranes.

9. A method, comprising:
  providing a gas mixture to a membrane separator comprising a membrane;
  separating the gas mixture into a first gas and a second gas using the membrane separator;
  measuring a performance characteristic of one or more of the gas mixture, the first gas, or the second gas, the membrane performance characteristic comprising at least one of a gas composition, a gas temperature, a gas flow rate, a thermodynamic state of a chemical in the permeate or non-permeate stream, or ratios thereof;
  measuring a composition of the gas mixture, the first gas, and the second gas;
  determining a thermodynamic state of the gas mixture;
  determining a current state of the membrane based on the performance characteristics and compositions, and the thermodynamic state, using a physical model;
  predicting a future state of the membrane using a membrane evolution model selected based on the measured performance characteristic;
  comparing the predicted future state of the membrane to a standard; and
  adjusting one of the performance characteristics, or the thermodynamic state, of the gas mixture based on the comparison.

10. The method of claim 9, wherein a first membrane evolution model is selected during a first time period and a second membrane evolution model, different from the first evolution model, is selected during a second time period.

11. The method of claim 9, wherein the selected membrane evolution model is a machine learning model.

12. The method of claim 9, wherein the membrane evolution model is trained using historical data from multiple membranes.

13. The method of claim 9, further comprising comparing the current state of the membrane to a standard and adjusting one of the performance characteristics, or the thermodynamic state, of the gas mixture based on the comparison of the current state of the membrane to the standard.

14. The method of claim 13, wherein a first membrane evolution model is selected during a first time period and a second membrane evolution model, different from the first evolution model, is selected during a second time period.

15. A method, comprising:
  providing a gas mixture to a membrane separator comprising a membrane;
  separating the gas mixture into a first gas and a second gas using the membrane separator;
  measuring a flowrate, temperature, pressure, and composition of one or more of the gas mixture, the first gas, or the second gas;
  determining a thermodynamic state of the gas mixture;
  determining a current membrane performance characteristic based on the flowrates, temperatures, pressures, compositions, and thermodynamic state, using a physical model, the current membrane performance characteristic comprising at least one of a gas composition, a gas temperature, a gas flow rate, a thermodynamic state of a chemical in the permeate or non-permeate stream, or ratios thereof;
  predicting a future membrane performance characteristic using a membrane evolution model selected based on the current membrane performance characteristic, the future membrane performance characteristic comprising at least one of a gas composition, a gas temperature, a gas flow rate, a thermodynamic state of a chemical in the permeate or non-permeate stream, or ratios thereof;
  comparing the predicted future membrane performance characteristic to a standard; and
  adjusting one of the flowrates, temperatures, pressures, compositions, or the thermodynamic state of the gas mixture based on the comparison.

16. The method of claim 15, wherein a first membrane evolution model is selected during a first time period and a second membrane evolution model, different from the first evolution model, is selected during a second time period.

17. The method of claim 16, wherein the selected membrane evolution model is a machine learning model.

18. The method of claim 17, wherein the membrane evolution model is trained using historical data from multiple membranes.

* * * * *